(12) United States Patent
Simpkins

(10) Patent No.: US 6,819,781 B1
(45) Date of Patent: Nov. 16, 2004

(54) METHOD AND APPARATUS FOR OPTICAL SENSOR SYSTEM AND OPTICAL INTERFACE CIRCUIT

(75) Inventor: Joseph A. Simpkins, West Chester, PA (US)

(73) Assignee: Mars Incorporated, McLean, VA (US)

( * ) Notice: Subject to any disclaimer, the term of this patent is extended or adjusted under 35 U.S.C. 154(b) by 0 days.

(21) Appl. No.: 09/106,878

(22) Filed: Jun. 30, 1998

Related U.S. Application Data

(63) Continuation of application No. 08/376,784, filed on Jan. 23, 1995, now Pat. No. 5,889,883.

(51) Int. Cl.[7] .................................................. G06K 9/00
(52) U.S. Cl. ........................ 382/112; 356/71; 382/135; 382/306
(58) Field of Search ................................ 382/112, 140, 382/162, 212, 312, 321, 135, 137, 306; 702/62; 250/208.1, 208.2, 208.3, 208.4, 208.5, 208.6; 235/383, 441, 451, 462.05, 462.24, 462.25

(56) References Cited

U.S. PATENT DOCUMENTS

| | | | | |
|---|---|---|---|---|
| 4,056,731 A | * | 11/1977 | Bayha .......................... 250/556 |
| 4,140,952 A |   | 2/1979  | Miller .......................... 318/478 |
| 4,149,487 A | * | 4/1979  | Kulbida et al. ............... 118/657 |
| 4,199,816 A |   | 4/1980  | Humphrey ................... 364/571 |
| 4,205,780 A | * | 6/1980  | Burns et al. .................. 340/454 |
| 4,406,996 A |   | 9/1983  | Oka |
| 4,550,433 A |   | 10/1985 | Takahashi ...................... 382/7 |
| 4,618,257 A |   | 10/1986 | Bayne et al. .................. 356/71 |
| 4,651,292 A |   | 3/1987  | Jeenicke et al. ............. 364/571 |
| 4,769,532 A |   | 9/1988  | Kawakami |
| 4,947,441 A |   | 8/1990  | Hara et al. |
| 5,023,704 A |   | 6/1991  | Hieda et al. ............... 358/29 C |
| 5,027,415 A |   | 6/1991  | Hara et al. |
| 5,199,543 A |   | 4/1993  | Kamagami et al. .......... 194/207 |
| 5,298,905 A | * | 3/1994  | Dahl ........................... 342/118 |
| 5,339,176 A |   | 8/1994  | Smilansky et al. .......... 358/504 |
| 5,471,039 A | * | 11/1995 | Irwin et al. .................. 235/441 |
| 5,486,690 A | * | 1/1996  | Ake ........................... 250/206.1 |
| 5,559,769 A | * | 9/1996  | Ando et al. ................ 369/44.27 |
| 5,818,019 A | * | 10/1998 | Irwin, Jr. et al. ............ 235/375 |
| 6,031,217 A | * | 2/2000  | Aswell et al. ............. 250/208.1 |
| 6,042,249 A | * | 3/2000  | Spangenberg ................ 362/259 |

FOREIGN PATENT DOCUMENTS

| | | |
|---|---|---|
| GB | 1384501 | 2/1975 |
| GB | 1442485 | 7/1976 |
| GB | 1470737 | 4/1977 |

* cited by examiner

Primary Examiner—Bhavesh M. Mehta
Assistant Examiner—Abolfazl Tabatabai
(74) Attorney, Agent, or Firm—Fish & Richardson P.C.

(57) ABSTRACT

An optical sensor system for validating documents transports a document under test between a light source and an optical interface circuit. A photodetector within the optical interface circuit generates an electrical current signal at its output based on the amount of detected light transmitted through and/or reflected by the document. A photodetector interface circuit is connected to the photodetector output and converts the current signal to a signal indicative of the detected light without undesirable electrical offsets, such as manufacturing, production and temperature offsets. In particular embodiments, the current signal is further processed to take advantage of the dynamic range of an associated analog converter.

36 Claims, 8 Drawing Sheets

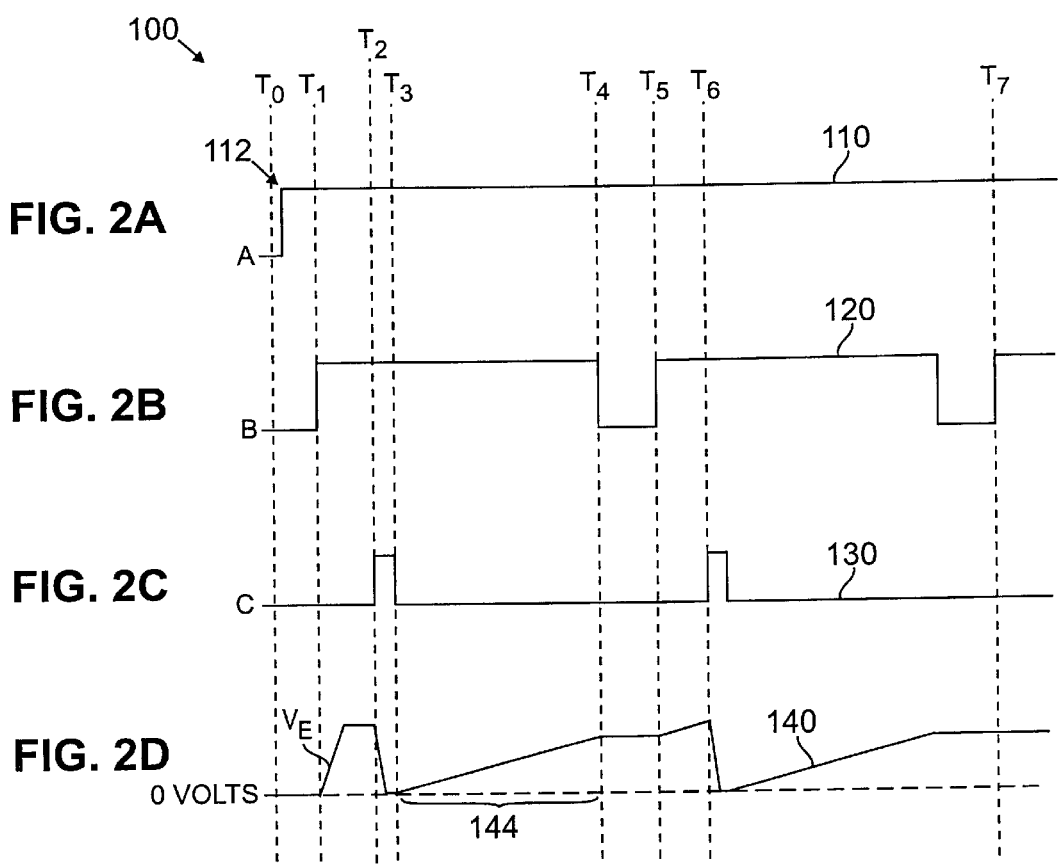

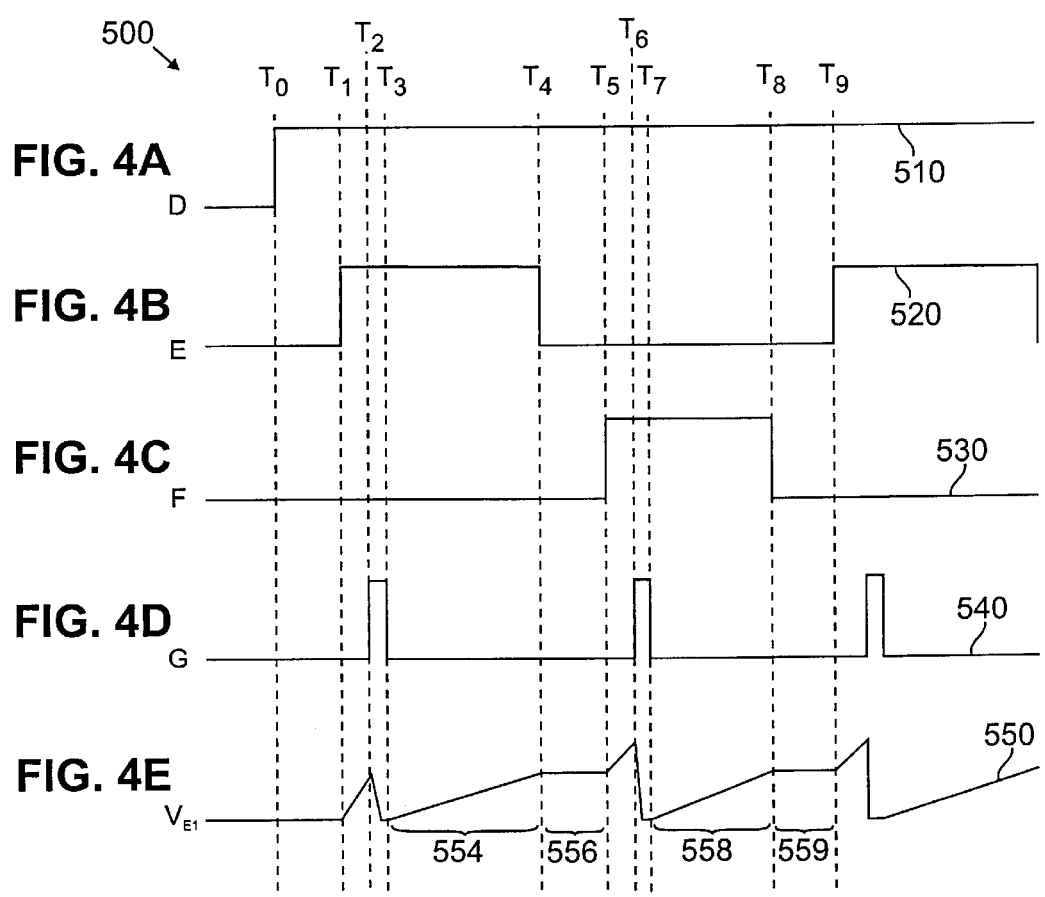

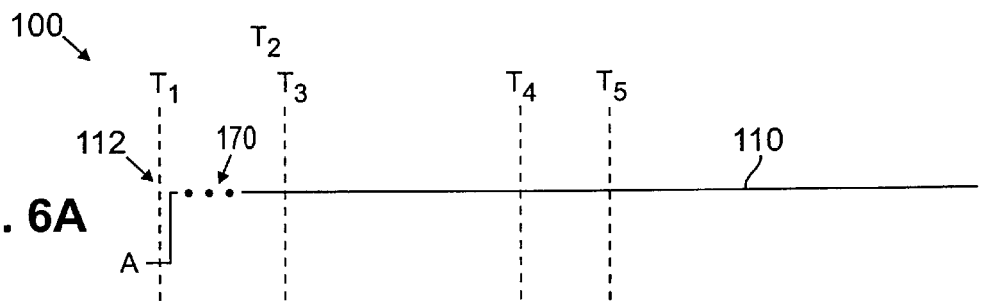
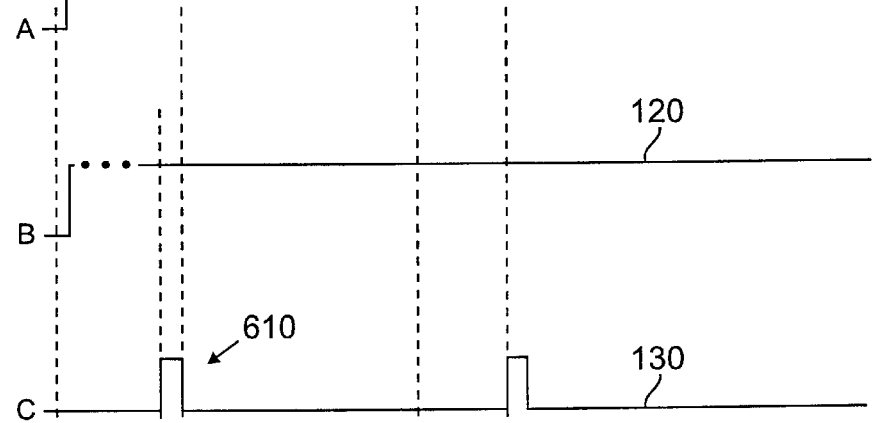
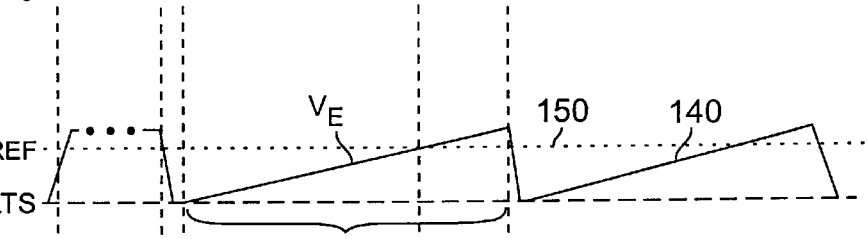
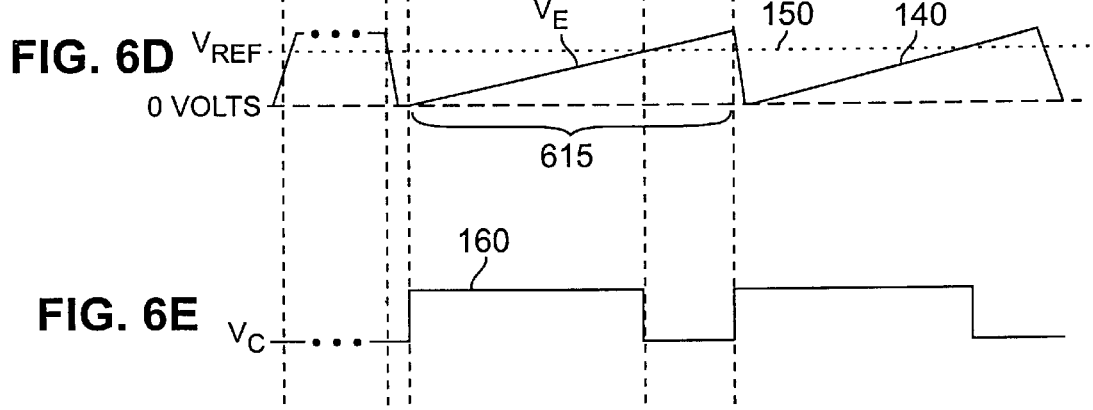
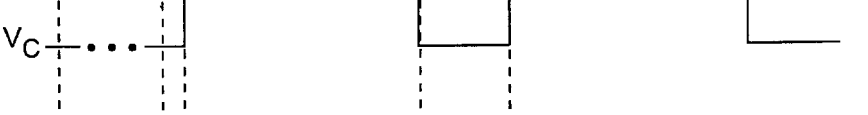

US 6,819,781 B1

METHOD AND APPARATUS FOR OPTICAL SENSOR SYSTEM AND OPTICAL INTERFACE CIRCUIT

This application is a continuation of Ser. No. 08/376,784 filed Jan. 23, 2000 now U.S. Pat. No. 5,889,883.

FIELD OF THE INVENTION

The present invention relates to an optical sensor system employing an optical interface circuit. More particularly, the optical interface circuit provides an improved data signal for the validation and/or discrimination of color documents.

BACKGROUND OF THE INVENTION

The use of optics to provide security checks and to validate color documents such as paper currency are known. Optical sensor systems typically comprise one or more light sources, a light detector, interface circuitry and a discriminator or microprocessor. The sensors measure the amount of light transmitted through or reflected from documents and an analog-to-digital converter outputs the digital data to a microprocessor for processing. Some prior art optical detection systems use an analog-to-digital converter to convert sampled optical signals into one of 256 possible values for processing. Measurements are typically taken over many predetermined places of the document under test.

U.S. Pat. No. 4,947,441 describes a bill discriminating apparatus having two color detectors for photoelectrically detecting light components contained in light transmitted through or reflected from bills to be discriminated. The bill discriminating circuitry includes a color correction circuit, two amplifying means, a gain adjustment circuit, and a differential amplifier to compare the outputs of the color detectors. A discriminator determines the validity of bills based on difference signals provided by an output from the differential amplifier.

A problem plaguing such prior art systems is that the electrical signal produced by the optical detectors typically comprise offsets which skew the bill data that is to be processed. The electrical offsets may include offsets resulting from manufacturing of the sensor, production of the optical system, and ambient light. Another electrical offset may be caused by an increase in temperature which produces a decrease in the illumination output of an LED light source. The corresponding decrease in detected light further skews the bill data.

These electrical offsets may be present in any combination and may vary from sensor to sensor. The combined electrical offsets make it virtually impossible for a microprocessor to discriminate actual bill data from the offsets. As a consequence, accurate ratio testing between two or more sensor outputs required by particular known acceptance algorithms is very difficult.

Several known calibration techniques are able to remove specific types of electrical offsets. For instance, one calibration technique utilizes additional hardware to regulate the current through LED light sources for adjusting their light output to balance the outputs of the corresponding optical sensors. This technique minimizes the electrical offsets due to manufacturing of the sensor and production of the system, but is costly to implement. Another well known calibration technique relies on the microprocessor to apply a stored compensation factor to the digital data obtained from the analog-to-digital converter to minimize the effects of the electrical offsets. However, this technique suffers from poor data resolution due to the inclusion of all of the electrical offsets in the data signal.

Therefore, a need exists for a low cost optical sensor system having an optical interface circuit that minimizes the effects of electrical offsets to achieve a maximum data resolution.

SUMMARY OF THE INVENTION

According to a first aspect of the invention, the optical sensor system comprises a processing unit connected to a controllable light source and the optical interface circuit. The controllable light source and the optical interface circuit are positioned relative to one another such that a document may be transported between them. A photodetector sensor and a photodetector interface circuit are disposed within the optical interface circuit. The photodetector interface circuit is connected to an output of the photodetector and to an input of the processing unit. The processing unit is capable of activating or deactivating the photodetector. When activated, the photodetector generates an electrical current signal at an output based on the amount of detected light. The photodetector interface circuit converts the generated electrical current to a signal that is provided to the processing unit. In generating the converted signal, the photodetector interface circuit compensates for electrical offsets, such as sensor manufacturing offsets, optical system production offsets and ambient light offsets, in the electrical current signal.

According to an embodiment of the present invention, the photodetector interface circuit may consist of a variable bias load, such as a capacitor and a reset switch, and a signal converter having an input and an output. The bias load and reset switch are connected to the photodetector output and to the signal converter input. The signal converter output is connected to the processing unit. The desired load resistance is achieved by resetting the capacitor to a reference voltage, such as zero volts, and then permitting it to charge in a linear manner for a charge time interval. The signal converter generates a digital signal based on the voltage across the capacitor at the end of the charge time interval. The load resistance may be varied by varying the charge time interval. The system reduces the effects of electrical offsets by adjusting the charge time interval accordingly.

According to another embodiment of the present invention, the photodetector interface circuit consists of an analog signal converter, a logarithmic current-to-voltage (I-to-V) converter, such as a diode, and a charge storage device. An input of the analog signal converter is connected to the photodetector output. An analog signal converter output is connected to the I-to-V converter and to the charge storage device. In this embodiment, the charge storage device is charged to a reference level based on the voltage drop over the I-to-V converter caused by a calibration signal at the analog signal converter input that corresponds to a maximum signal that can possibly be generated by the photodetector. Such charge is maintained while the photodetector output provides a signal to the analog signal converter based on the amount of detected light. The corresponding signal generated by the analog signal converter causes a voltage over the I-to-V converter which produces a difference voltage at one end of the charge storage device. The difference voltage corresponds to the difference of the calibration signal and the signal generated by the photodetector. The difference voltage is inversely logarithmically proportional to the amount of detected light with electrical offsets being substantially eliminated.

According to a further embodiment of the present invention, the processing unit measures the time interval required for the capacitor to charge to a predetermined voltage threshold in order to determine a document's validity. In this embodiment, electrical offsets may be reduced by adjusting the corresponding threshold voltage or by scaling by reference compensation factors stored in the processing unit. According to yet another embodiment of the present invention, at least one photodetector interface circuit may be employed with a plurality of photodetectors, wherein two or more photodetectors are multiplexed to a corresponding photodetector interface circuit which facilitates the testing of various areas of a document with a reduced number of components.

Additional features and advantages of the present invention will become apparent by reference to the following detailed description and accompanying drawings.

DESCRIPTION OF THE DRAWINGS

FIG. 2 is a timing diagram of exemplary signals waveforms which may be generated by the optical sensing system of FIGS. 2A-2D depict;

FIGS. 4A-4E depict is a timing diagram of exemplary signal waveforms which may be generated by a first channel of the multi-sensor optical sensing system of FIG. 3;

FIGS. 6A-6E depict is a timing diagram of exemplary signals waveforms which may be generated by the optical sensing system of FIG. 1 employing the photodetector interface circuit of FIG. 5;

DETAILED DESCRIPTION

The optical interface apparatus and method of the present invention can be used in an optical sensor system for validating or discriminating documents such as paper currency. Consequently, a contemplated use is in a paper currency or banknote validator for discriminating between different denominations of paper currency of a particular country. Thus, the invention is described below with reference to validating paper currency, which is not meant to be a limitation on the use of the invention.

Figure 1:
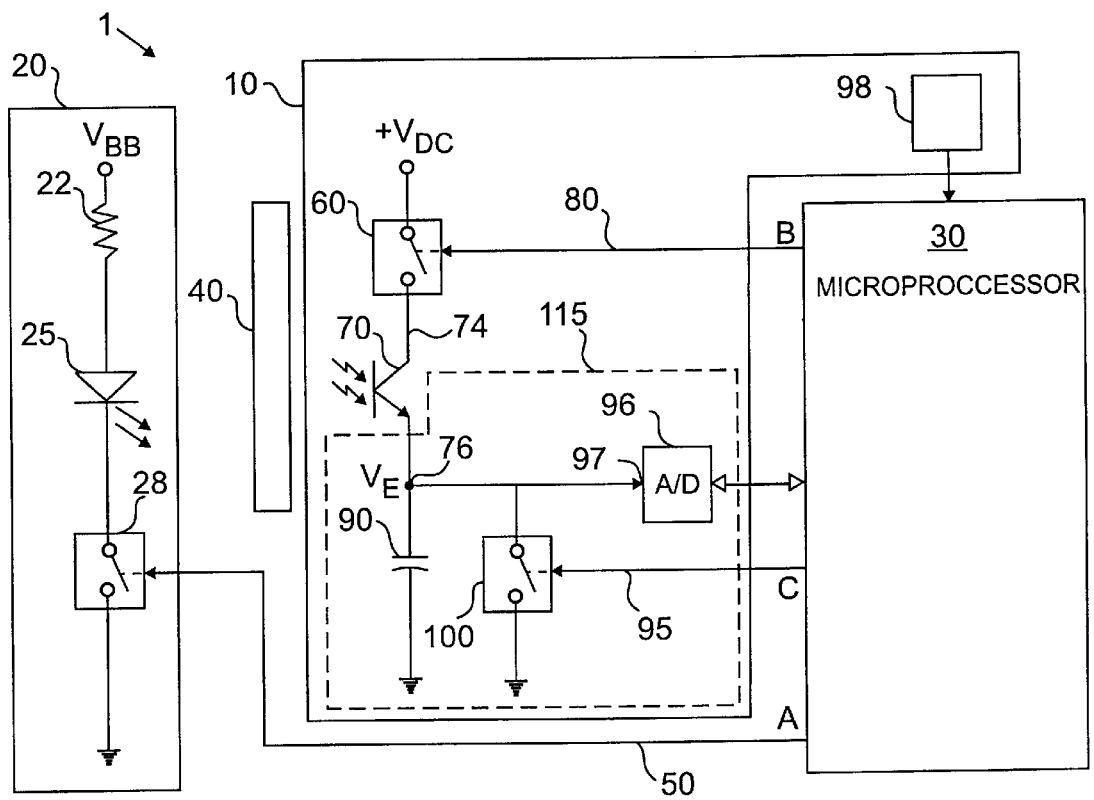
FIG. 1 is a schematic block diagram of an optical sensing system according to one embodiment of the present invention.

An optical sensing system 1 according to one embodiment of the present invention is shown in FIG. 1. The optical sensing system 1 includes a processing unit, such as a microprocessor 30, connected to an optical interface circuit 10 and a controllable light source 20. The microprocessor 30 controls the operations of the controllable light source 20 and the optical interface circuit 10 during validation of a banknote 40.

An exemplary configuration of the controllable light source 20 consists of a resistor 22, a light source 25 and a light enable switch 28. A fixed voltage $V_{BB}$ is applied to the resistor 22 which is connected to the light source 25. A suitable light source 25 may be of the solid state variety, such as a light emitting diode ("LED"). The light source 25 is further connected to the light enable switch 28 which may be a conventional relay or solid state switch, such as a suitably biased transistor.

The light enable switch 28 is also connected to ground. The light enable switch 28 operates in either a closed position, whereby the light source 25 is connected to ground and illuminates, or an open position, as shown in FIG. 1, whereby the light source 25 is disconnected from ground and does not illuminate. The position of the switch 28 is controlled by a control signal A transmitted by the microprocessor 30 on a control line 50. The light source 20 illuminates portions of the banknote 40 as it is transported between the light source 20 and the optical interface circuit 10. A suitable LED emitting in the red and infrared ranges is an OP 4460 from Optek Technology, Inc., Carollton, Tex., for example. A suitable LED emitting only in the infrared range is an OP 4461, also from Optek.

The amount of the light transmitted through, or reflected from predetermined regions of the banknote 40 will be detected by the optical interface circuit 10. An exemplary circuit configuration for the optical interface circuit 10 includes a light detector enable switch 60 that connects or disconnects a photodetector sensor, such as a phototransistor 70, to a fixed voltage $V_{DC}$. A suitable phototransistor 70 is a BPX43 available from TEMIC Telefunken Microelectronics GmbH of Heilbonn, Germany.

In a closed position, the switch 60 applies the fixed voltage $V_{DC}$ to a collector 74 of the phototransistor 70, and in an open position, as shown in FIG. 1, the switch 60 disconnects the phototransistor 70 from the fixed voltage $V_{DC}$. The light detector enable switch 60 is controlled by a control signal B transmitted by the microprocessor 30 over a control line 80. The fixed voltage $V_{DC}$ should be selected to cause the phototransistor 70 to operate in its linear region when connected to the fixed voltage VDC. The light source 25 and photodetector 70 may generate and receive light of a specific color component required for the validation of the banknote 40. For example, color components of red, green and infra-red are often used for validating U.S. banknotes.

A photodetector output, such as an emitter 76 of the phototransistor 70, is connected to a charge storage device such as a capacitor 90, a controllable reset switch 100, and an input 97 of a signal converter such as an analog-to-digital converter 96. The capacitor 90 and the reset switch 100 are also connected to ground. The photodetector 70 generates electrical current at its output 76 based on the amount of detected light. A voltage signal present at the capacitor 90 is represented by the voltage signal $V_E$. The capacitor 90, reset switch 100 and analog-to-digital converter 96 form a photodetector interface circuit as denoted by the outline 115.

The reset switch 100 is controlled by a control signal C that is generated by the microprocessor 30 over a control line 95. The reset switch 100 operates in a closed position to connect the photodetector output 76 to ground, or in an open position, as shown in FIG. 1, to disconnect the photodetector output 76 from ground. The microprocessor 30 receives digital data corresponding to the voltage signal $V_E$ from the digital-to-analog converter 96. Also, the microprocessor 30 receives temperature data from a temperature sensor 98. A suitable temperature sensor 98 is a LM35 available from National Semiconductor Corporation.

A timing diagram 100 illustrating an exemplary operation of the optical sensor system of FIG. 1 is shown in FIGS. 2A-2D. In FIGS. 2A-2D, The control signals A, B and C are represented by waveforms 110, 120 and 130, respectively, and the voltage signal $V_E$ is represented by the waveform 140. In FIGS. 2A-2C, the waveforms 110, 120 and 130 are illustrated with ideal rise and fall times for clarity. It should be readily apparent to those having ordinary skill in the art that the signals corresponding to waveforms 110, 120 and 130 would have respective rise and fall times. Such rise and fall times will not significantly effect the operation of the optical sensor system 1 as described with respect to FIGS. 2A-2D. The operation of the optical sensor system 1 represented by the waveforms of FIGS. 2A-2B is such that when control signal waveforms 110, 120 and 130 are at a high voltage level the corresponding switches 28, 60 and 100 operate in the closed position. Conversely, when the control signal waveforms 110, 120 and 130 are at a low voltage level the corresponding switches operate in the open position.

Referring to FIG. 1 and FIGS. 2A-2D, during validation, the banknote 40 is transported between the light source 25 and the photodetector 70 at time $T_0$. In response, the microprocessor 30 generates the control signal A at a high voltage level, as shown at region 112 of the waveform 110. Generation of the control signal A at the high voltage level causes the light source enable switch 28 to close and the light source 25 to illuminate. The microprocessor 30 then closes the light detector enable switch 60 by generating the control signal B at a high voltage level as shown at time $T_1$ of the waveform 120.

Immediately prior to a time when a predetermined banknote portion of interest is transported between the light source 25 and the photodetector 70, such as at time $T_2$, the microprocessor 30 generates the control signal C at a high logic level to close the reset switch 100. The banknote 40 can be transported by belts or rollers, for example, as is known in the art. A stationary banknote 40 can be examined in accordance with the present invention as well. The reset switch 100 is held closed until the predetermined banknote portion of interest is transported between the light source 25 and the photodetector 70, such as at time $T_3$. The time duration between times $T_2$ and $T_3$ should be chosen such that the capacitor 90 has sufficient time to discharge to a reference voltage such as zero volts. Since the capacitor 90 is discharged to 0 volts at time $T_3$, the corresponding voltage signal $V_E$ 140 will also be 0 volts at time $T_3$.

At time $T_3$, the reset switch 100 is opened and the capacitor 90 begins to charge at a rate based on the amount of electrical current supplied by the photodetector output 76. The current generated by the photodetector 70 corresponds to the detected light reflected by or transmitted through the predetermined banknote portion of interest. As the capacitor 90 charges, the corresponding voltage signal $V_E$ will increase in voltage as shown by a voltage ramp 144 in the waveform 140. The capacitor 90 is permitted to charge for a predetermined charging time interval, such as the duration between times $T_3$ and $T_4$. Upon completion of the charge time interval at time $T_4$, the microprocessor 30 opens the light sensor enable switch 60 by generating the control signal B at a low voltage level. As a result, the photodetector 70 stops generating electrical current at its output 76 and the voltage signal $V_E$ is held at a constant level by the charge stored in the capacitor 90. The voltage signal $V_E$ is held at this constant level for a corresponding hold period as shown by the waveform 140 between times $T_4$ and $T_5$.

While the voltage signal $V_E$ is held constant, the analog-to-digital converter 96 samples the voltage signal $V_E$. The corresponding digital values generated by the analog-to-digital converter 96 are then provided to the microprocessor 30 for further processing and acceptance testing. Upon completion of the hold period at the time $T_5$, the light detector enable switch 60 is closed by the generating of the control signal B at a high voltage level. When the next predetermined banknote portion of interest is transported between the light source 25 and the phototransistor 70, the microprocessor 30 again opens and closes the reset switch 100, such as at time $T_6$, to perform another charging and sample operation.

A photodetector sensor, such as the phototransistor 70 of FIG. 1, operates to produce a specific amount of current when exposed to certain levels of light. The photodetector interface circuit 115 operates the capacitor 90 as a variable bias load of the photodetector 70. The capacitor 90 charges linearly during the charge time interval to generate the corresponding voltage signal $V_E$.

An expression for the voltage signal $V_E$ during the charge time interval is as follows:

$$V_E = \frac{1}{C_{Total}} \int_o^T i(t) d(t)$$

where the value $C_{Total}$ is equal to the sum of the capacitance of the capacitor 90 and the internal-dynamic capacitance of the phototransistor 70, and the value T is the duration of the charge time interval. A typical internal-dynamic capacitance for a conventional phototransistor is approximately 7500 pF. The voltage expression $V_E$ may be simplified by assuming the light level remains essentially constant during a relatively short charge period. As a consequence, the corresponding current produced by the phototransistor 70 would be essentially constant. The equation for the simplified expression is as follows:

$$V_E = \frac{i}{C_{Total}} \int_o^T dt = \frac{iT}{C_{Total}}$$

A bias load resistance $R_{bias}$ of the capacitor 90 may then be expressed as:

$$R_{bias} = \frac{V_E}{i} = \frac{iT}{C_{Total} i} = \frac{T}{C_{Total}}$$

The effective bias load resistance $R_{bias}$ is equal to the charge time interval divided by the total capacitance. Thus, the resistance of the sensor bias load of the photodetector 70 may be varied by adjusting the duration of the charge time interval. Accordingly, the voltage signal $V_E$ corresponding to the photodetector output current may be adjusted or calibrated by varying the charge time interval as described below. Thus, in accordance with a first aspect of the present invention, the photodetector interface circuit 115 removes the electrical offsets, such as manufacturing, production or temperature induced offsets, from the voltage signal provided to the analog-to-digital converter 96 by adjusting the charge time interval.

In removing the temperature induced offsets, the microprocessor 30 adjusts the charge time interval based on the temperature data received from the temperature sensor 98. For example, the microprocessor 30 may use the data received from the sensor 98 to formulate the required adjustment of the charge time interval. Further, the temperature data may be used to identify the proper charge time interval adjustment in a look-up table which may, for example, be contained in a read only memory (ROM) associated with the microprocessor 30.

The present invention achieves an improved data resolution by exploiting nearly the entire dynamic range of the analog-to-digital converter 96 for banknote data by minimizing or eliminating the electrical offsets in the analog voltage signal $V_E$. This improved data resolution is achieved with a minimum number of low cost components. As a result, the digital data generated by the analog-to-digital converter 96 may suitably be used for ratio testing between two or more sensors in an acceptance algorithm.

A suitable optical sensor system 1 may use a microprocessor 30 capable of producing charge time interval durations between 408 ns and 2.7 ms with a resolution of 408 ns, and a capacitor 90 of 0.331 μF. Accordingly, the controllable range of the resistance of the variable sensor bias load is between 10.1Ω and 1.05 MΩ with a resolution of 10.1Ω. Such charge time intervals and corresponding bias loads have been found sufficient for sensors in testing of U.S. banknotes.

The proper duration of the charge time interval may be determined by calibration of the optical sensing system 1. One suitable calibration technique determines the charge time interval that causes the generation of a voltage signal $V_E$ of a specific expected voltage value when a calibration surface, such as a card or reference surface is detected by the photodetector 70. For example, a calibration card may be substituted for the banknote 40 and transported through the system 1 of FIG. 1. In a similar manner, the photodetector 70 may detect a properly colored reference surface when a banknote 40 is not being transported between the controllable light source 20 and the photodetector 70. The calibration card or reference surface should possess the average color transmission or reflection characteristics of the documents to be validated. Yet another alternative would be to use a known authentic banknote 40 as the calibration surface during calibration of the system 1. The proper charge time interval may be obtained by perform a calibration operation of a binary search of specific charge time interval durations for the calibration surface, and storing the identified "best fit" duration value in the microprocessor 30.

Although the photodetector 70 of FIG. 1 is activated or deactivated by closing and opening the switch 60, other techniques may be used to perform such operations. For instance, the photodetector 70 may be directly connected to the voltage source $V_{DC}$ with the switch 60 being disposed between the photodetector output 76 and the photodetector interface circuit 115. In this configuration, when the switch 60 is opened, the photodetector output 76 would be open-circuited and no current would be generated by the photodetector 70. Therefore, the photodetector 70 would be effectively deactivated. When the switch 60 is closed, the photodetector output 76 would be connected to the capacitor 90 and the photodetector 70 would be activated to provide current to the capacitor 90 corresponding to the detected light intensity.

Figure 3:
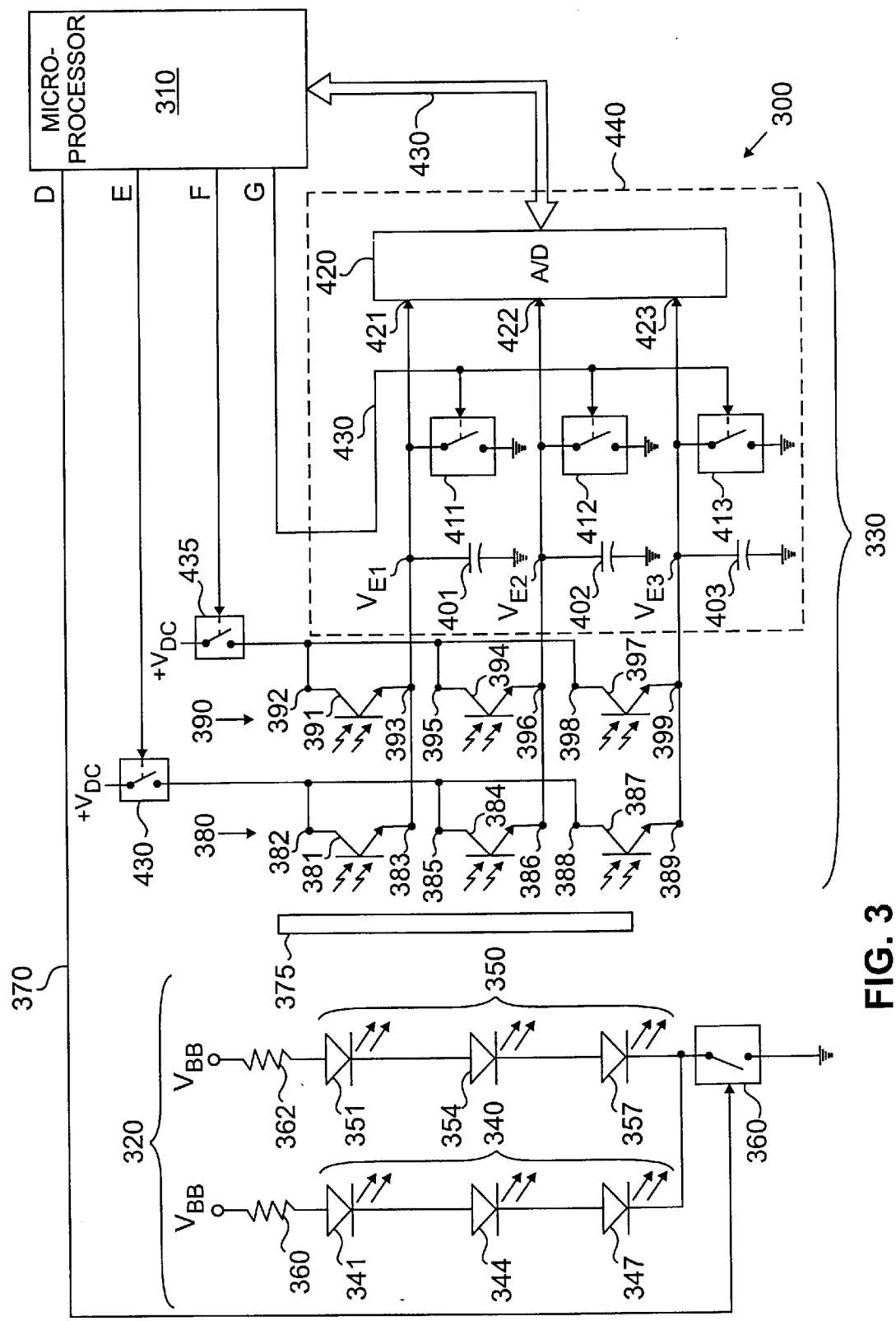
FIG. 3 is a schematic block diagram of a multi-sensor optical sensing system similar to the system of FIG. 1.

FIG. 3 depicts a multiple sensor optical sensing system 300 analogous to the single sensor optical sensing system 1 of FIG. 1. The optical sensor system 300 employs a processing unit such as a microprocessor 310, controllable light sources 320 and a multiplexed optical interface circuit 330. In FIG. 3, an exemplary configuration of the controllable light sources 320 consist of infra-red light sources 341, 344 and 347, red light sources 351, 354 and 357 and a light enable switch 360. A fixed voltage $V_{BB}$ is applied to resistors 360 and 362 which are connected to the infra-red light source 341 and the red light source 351, respectively.

The infra-red light sources 341, 344 and 347 are connected in series to form an infra-red light source set 340. In a similar manner, red light sources 351, 354 and 357 are connected in series to form a red light source set 350. Suitable infra-red and red light sources 341, 344, 347, 351, 354 and 357 include LED light sources include those described above with respect to FIG. 1, or any light sources which generate light output of the required wavelength. The use of three infrared and three red light sources in FIG. 3 is for illustration purposes only which is not meant to be a limitation of the present invention. Any number of light sources of one or more colors may be used in accordance with the present invention.

The light enable switch 360 is connected to the light sources 347 and 357, and operates to connect or disconnect both the infra-red and red light source sets 340 and 350 to ground. In a closed position, the switch 360 connects the light source sets 340 and 350 to ground and illuminates the light sources 341–347 and 351–357. In an open position, the switch 360 disconnects the light source sets 340 and 350 from ground.

The position of the switch 360 is controlled by a light enable control signal D transmitted by the microprocessor 310 on a control line 370. The infra-red and red light sources 341–347 and 351–357 should be positioned to illuminate predetermined regions of a banknote 375 as it is transported within the optical sensing system 300. For instance, the light sources 341–347 and 351–357 may be located at respective left, center and right regions orthogonal to the direction of travel of the banknote 375.

The multiplexed optical interface circuit 330 contains an infra-red light detector enable switch 430 and a red light detector enable switch 435 that connects or disconnects respective sets of infra-red photodetectors 380 and red light photodetectors 390 to a fixed voltage $V_{DC}$. The set of infra-red photodetector sensors 380 consists of phototransistors 381, 384 and 387, and the set of red light photodetectors 390 consists of phototransistors 391, 394 and 397. Each of the infra-red photodetectors 381, 384 and 387 should be positioned within the optical sensing system 300 to detect light generated from a corresponding one of the infra-red light sources 341, 344 and 347, respectively. Likewise, the red light photodetectors 391, 394 and 397 are positioned to detect light from respective ones of the red light sources 351, 354 and 357.

In closed positions, the switches 430 and 435 apply the fixed voltage $V_{DC}$ to infra-red phototransistor collectors 382, 385 and 388, and red light phototransistor collectors 392, 395 and 398, respectively. In open positions, the switches 430 and 435 disconnect the phototransistor sets 380 and 390 from the fixed voltage $V_{DC}$. The microprocessor 310 controls the light detector enable switches 430 and 435 by generating infra-red and red light sensor enable signals E and F, respectively. Outputs 383 and 393 of the infra-red and red light photodetectors 381 and 391 are connected in common to a first input channel 421 of a multi-channel analog-to-digital converter 420. In a similar manner, outputs 386 and 396 of the photodetectors 384 and 394 are connected in common to a second input channel 422 of the analog-to-digital converter 420, and outputs 389 and 399 of the photodetectors 387 and 397 are connected in common to a third input channel 423 of the analog-to-digital converter 420.

Charge storage devices such as capacitors 401, 402, 403 are each connected in parallel to corresponding controllable reset switches 411, 412 and 413 between the respective analog-to-digital converter inputs 421–423 and ground.

Voltage signals present at the capacitors 401, 402 and 403 are represented by reference symbols $V_{E1}$, $V_{E2}$ and $V_{E3}$, respectively. The analog-to-digital converter 420 provides digital data corresponding to the voltage signals $V_{E1}$, $V_{E2}$ and $V_{E3}$ to the microprocessor 310 on data communication lines 430.

Each one of the reset switches 411–413 operates to connect or disconnect a respective one of capacitors 401–403 to ground. In this manner, the capacitors 401–403 may be permitted to charge, or be discharged, to operate as respective variable sensor bias loads in a substantially similar manner to that described above with respect to FIGS. 1 and 2A-2D. The positions of the reset switches 411–413 are collectively controlled by a reset control signal G transmitted by the microprocessor 310 on a control line 430. Based on the control signal G, each one of the reset switches 411–413 may be operated in closed positions to connect the respective capacitor 401–403 to ground, or in open positions disconnect the respective capacitor 401–403 from ground. The capacitors 401–403, reset switches 411–413 and multi-channel analog-to-digital converter 420 operate as a multi-channel photodetector interface circuit as illustrated by broken outline 440.

In operation, when a banknote 375 is transported between the two sets of light sources 340 and 350, and the corresponding two sets of photodetectors 380 and 390, the microprocessor 310 illuminates the light sources 320 by closing the light enable switch 360. The microprocessor 310 then selectively performs infra-red and red light detection of predetermined banknote regions as the banknote 375 is transported between the light sources 320 and the phototransistor sets 380 and 390. The infra-red and red light detection is performed in a substantially similar manner to the operation of the optical sensor system 1 of FIG. 1. The particular one of photodetector sets 380 or 390 that is activated depends upon whether infra-red or red light detection is to be performed on a banknote region. Requirements of an associated acceptance or discrimination algorithm determine which type of detection is to be performed.

The microprocessor 310 regulates charge time intervals of the capacitors 401–403 in the multi-channel photodetector interface circuit by controlling the timing of the activation and deactivation of the photodetector sets 380 and 390, and closing and opening of the reset switches 411–413. The charge time interval for each photodetector set 380 and 390 may be different and are based on the characteristics of the sensors contained in that set.

Activation of a photodetector set 380 or 390 occurs by generation of the corresponding control signal E or F at a high voltage level. Only one of the photodetector sets 380 or 390 may be activated at a given time. The corresponding generated voltage signals $V_{E1}$, $V_{E2}$ and $V_{E3}$ provided to the analog-to-digital converter 420 contain banknote data without electrical offsets.

FIGS. 4A-4B depict a timing diagram 500 of the control signals D, E, F, and G, and the voltage signal $V_{E1}$ at the first analog-to-digital converter input channel 421 during an exemplary operation of the optical sensing system 300 of FIG. 3. In FIGS. 4A-4D, the control signals D, E, F and G are represented by the waveforms 510, 520, 530 and 540, respectively, and the voltage signal $V_{E1}$ is represented by the waveform 550.

Referring to FIGS. 3 and 4A-4E, at time $T_0$, when the banknote 375 is starting to be transported through the system 300, the microprocessor 310 illuminates the light sources 320 by generating the control signal D 510 at a high voltage level. The light sources 341–347 and 351–357 may remain illuminated during the duration of the banknote acceptance test.

Immediately prior to the time when a banknote region requiring infra-red testing is about to be transported between the infra-red light sources and sensor sets 340 and 380, such as at time $T_1$, the microprocessor 310 generates the infra-red sensor enable signal E at a high voltage level. The signal E at high voltage level activates the infra-red photodetectors 381, 384 and 387. At the same time, the microprocessor 310 deactivates the red light photodetectors 391, 394, and 397 by generating the red light sensor enable signal F at a low voltage level. Upon activation, the infra-red photodetectors 381, 384 and 387 generate electrical current at their respective outputs 383, 386 and 389 based on the corresponding amount of detected infra-red light from the banknote 375.

Then, at time T2, the reset switches 411–413 are closed for a sufficient duration to discharge the capacitors 401–403 to 0 volts immediately before the predetermined banknote regions of interest are transported between the light sources 320 and the infra-red photodetector set 380. The microprocessor 310 generates the control signal G at a high logic level to close the reset switches 411–413. The reset switches 411–413 should be opened again when the banknote regions of interest are transported between the light sources 320 and the photodetector set 380 which occurs at time $T_3$ in FIGS. 4A-4E. As indicated above with respect to the reset switch 100 of FIG. 1, the discharge duration between times $T_2$ and $T_3$ should be selected such that at time $T_3$, the corresponding voltage signal $V_{E1}$ goes to 0 volts.

Upon opening the reset switches 411–413 at the time $T_3$, the capacitor 401–403 charge in a linear fashion based on the current supplied by the respective photodetector outputs emitters 383, 386 and 389. The linear charging of the first capacitor 411 is shown as a voltage ramp 554 of the voltage signal $V_{E1}$ waveform 550. The capacitors 411–413 are permitted to charge for a predetermined charge time interval, such as the duration between times $T_3$ and $T_4$. After completing the charge time interval at the time $T_4$, the microprocessor 310 deactivates the infra-red photodetectors 381, 384 and 387 by generating the control signal E at a low voltage level. Accordingly, the photodetectors 381, 384 and 387 stop generating electrical current and the voltage signals $V_{E1}$, $V_{E2}$ and $V_{E3}$ are held at constant levels by the charges stored in the capacitors 401–403. The constant voltage of the voltage signal $V_{E1}$ is shown in region 556 of the waveform 550. The duration of the charge time interval which determines the resistance of the sensor bias loads of the photodetectors 381, 384 and 387 is selected to negate any electrical offsets in the manner described above with regard to FIG. 1.

The analog-to-digital converter 420 samples the voltage signals $V_{E1}$, $V_{E2}$ and $V_{E3}$ at its input channels 421–423 while the voltage signals $V_{E1}$, $V_{E2}$ and $V_{E3}$ are held at constant voltage levels. The corresponding digital values generated by the analog-to-digital converter 420 concerning the detected infra-red light levels are then provided to the microprocessor 310 for further processing and acceptance testing.

In the example illustrated in FIGS. 4A-4E, the next predetermined portion of the banknote 375 that is transported between the light sources 320 and sensor sets 380 and 390 requires red light detection at time $T_7$ according to the corresponding acceptance algorithm. Accordingly, the red light sensor enable signal F is generated at a high voltage level immediately before time $T_7$, such as at time $T_5$, which causes the red light photodetectors 391, 394 and 397 to generate an electrical current signal based on the detected amount of red light.

The microprocessor 310 then resets the capacitors 401–403 to 0 volts between times $T_6$-$T_7$ by generating the control signal G at a high voltage level. At time $T_7$, when the banknote region of interest is transported between the red light source set 340 and the corresponding photodetector set 390, the capacitors 401–403 are permitted to charge for a predetermined charge time interval based on the amount of red light detected by the photodetectors 391, 394 and 397. This charge time interval is selected based on the red light source set 350 and the red light photodetectors 390 and may be different than that used for the infra-red photodetector set 380.

The charging of the capacitor 401 is shown by a voltage ramp 558 in the voltage signal $V_{E1}$, waveform 550 between times $T_7$ and $T_8$. Then at time $T_9$, the red light sensor enable signal F is generated at a low voltage level and the red light photodetectors 391, 394 and 397 are deactivated. As a consequence, the voltage signals $V_{E1}$, $V_{E2}$ and $V_{E3}$ corresponding to the levels of detected red light are held at a constant voltage level by the charge stored in the capacitors 401–403. The analog-to-digital convertor 420 then samples the voltage signals $V_{E1}$, $V_{E2}$ and $V_{E3}$ and provides the corresponding digital data to the microprocessor 310. Accordingly, as predetermined banknote regions of interest are sequentially transported between the light sources 320 and the photodetector sets 380 and 390, the microprocessor 310 activates the proper photodetector set 380 or 390, and resets the switches 411–413 to obtain data for these regions for further processing and acceptance testing.

Thus, the optical interface apparatus 330 permits infra-red and red light level detection to be taken across a banknote 375 by multiplexing the six photodetectors 381, 384, 387, 391, 394 and 397 on three channels of an analog-to-digital converter 420. The multiplexed optical interface circuit 300 multiplexes two photodetectors on each of three analog-to-digital converter input channels 421–423 to illustrate the minimal number of components required by the multichannel photodetector interface circuits of the present invention. Further, any number of photodetectors may be multiplexed on any number of input channels according to the present invention.

An advantage is achieved by multiplexing photodetectors of colored light components requiring charge time intervals of approximately the same time ranges to minimize circuit complexity and cost. For instance, suitable charge time intervals for infra-red and red light photodetectors have been found to be within the range of 408 ns to 2.7 ms for U.S. banknotes and have been shown multiplexed on the same analog-to-digital converter input channels 421–423 in FIG. 3.

A separate channel may be required for those photodetectors of light components that deviate significantly from a particular charge time interval range. Although not illustrated in FIG. 3, the optical interface circuit 330 may also include a temperature sensor connected to the microprocessor 310, such as the temperature sensor 98 in FIG. 1. In such a circuit, temperature data may be provided to the microprocessor 310 to alter the charge time intervals to eliminate the effects of any temperature induced offsets electrical offsets in the corresponding voltage signals $V_{E1}$, $V_{E2}$ and $V_{E3}$.

Figure 5:
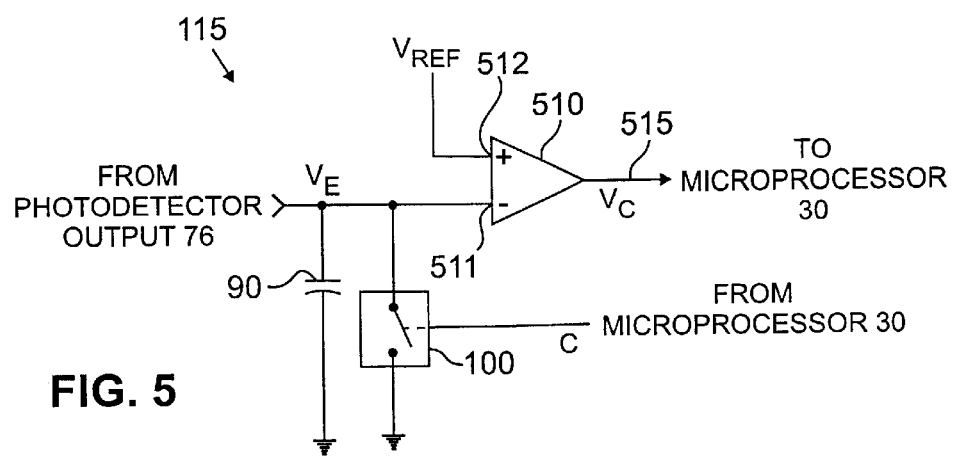
FIG. 5 is a schematic block diagram of an alternative photodetector interface circuit for use in the system of FIG. 1.

The photodetector interface circuits 115, 440 employed in the optical sensor systems 1 and 300 of FIGS. 1 and 3, respectively, operate to vary a charge time interval in order to compensate for the undesirable electrical offsets. In a complementary manner, FIG. 5 shows an alternative embodiment of the photodetector interface circuit 115 of FIG. 1 which determines the amount of light detected by a corresponding photodetector by measuring the time duration required for a photodetector output signal to reach a preset threshold voltage. In FIGS. 1 and 5 similar components have been like numbered for clarity, for example, the capacitor 90 and the voltage $V_E$.

Referring to FIG. 5, the capacitor 90 and the reset switch 100 are connected to the photodetector output 76, shown in FIG. 1, and to a first input 511 of a comparator signal converter 510. The capacitor 90 and the reset switch 100 are also connected to ground. A second comparator input 512 is connected to a reference voltage $V_{REF}$. The comparator 510 generates an voltage signal $V_C$ at an output 515 that is connected to the microprocessor 30, shown in FIG. 1. The reset switch 100 operates in an open or closed position as controlled by the control signal C generated by the microprocessor 30. The comparator 510 generates a high voltage signal at its output 515 when the voltage signal $V_E$ is less than the reference voltage $V_{REF}$, and generates a low voltage signal when the voltage signal $V_E$ is greater than the reference voltage $V_{REF}$.

FIGS. 6A-6E depict an exemplary operation of the optical sensing system 1 of FIG. 1 employing the photodetector interface circuit 115 of FIG. 5. Voltage signal waveforms that are common in FIGS. 2A-2D and 6A-6E are like numbered for clarity. For example, the light source enable control signal A 110, photodetector enable control signal B 120, reset control signal C 130 and the voltage signal $V_E$ 140 are all shown in both FIGS. 2A-2D and 6A-6F. The fixed voltage signal $V_{REF}$ is represented as a waveform 150 that is super-imposed over the voltage signal $V_E$ 140 in FIG. 6. In addition, the comparator output voltage signal $V_C$ is represented by a waveform 160.

Referring to FIGS. 1, 5 and 6A-6F, immediately after detecting that a banknote 40 is being transported between the light source 25 and the photodetector 70, such as at time $T_0$, the microprocessor 30 generates the control signals A 110 and B 120 in a high logic state to illuminate the light source 25 and activate the photodetector 70. The photodetector 70 may be activated for the duration of the banknote discrimination test when using the photodetector interface circuit 115 of FIG. 5, as indicated by the generation of the control signal B in a high logic state for the duration of the discrimination test in FIGS. 6A-6E.

As in the case illustrated by the timing diagram of FIGS. 2A-2D the capacitor 90 is discharged to 0 volts immediately prior to when a banknote portion of interest is transported between the light source 25 and photodetector 70, such as at time $T_3$. Accordingly, the microprocessor 30 generates a pulse 610 at a time $T_2$ for the control signal C to temporarily close the reset switch 100 and discharge the capacitor 90 to 0 volts. In addition, prior to time $T_3$, the comparator output signal $V_C$ would be in a low logic state because the capacitor 90 would have had sufficient time to charge to a voltage potential greater than the reference voltage $V_{REF}$ as indicated by the ellipses 170. At time $T_3$, the reset switch is opened causing the capacitor 90 to charge in a linear fashion, as indicated by the ramp 615 of the voltage signal $V_E$ 140. Since the input voltage signal $V_E$ to the comparator 510 of FIG. 5 has a lower voltage than the reference voltage $V_{REF}$ at time $T_3$, the comparator generates the signal $V_C$ 160 in a high logic state.

After time $T_3$, when the capacitor 90 has charged to a voltage $V_E$ equal to the reference voltage $V_{REF}$, such as at time $T_4$, the comparator 510 again generates its output signal $V_C$ in a low logic state. The pulse width of the voltage signal $V_C$ between the times $T_3$ and $T_4$ indicates the amount of light detected for the corresponding region of interest. A suitable microprocessor 30 capable of detecting sufficiently small pulse widths is a HC11E9 available from Motorola operating at 9.8304 MHz.

In the photodetector interface circuit 115 illustrated in FIG. 1, the charge time interval was varied to cause a corresponding bias resistance $R_{bias}$ to generate a voltage representative of the detected light without electrical offsets. In an analogous manner, the photodetector interface circuit of FIG. 5 may vary the reference voltage $V_{REF}$ to generate a pulse width that corresponds to the amount of detected light. In other words, since the integration time $T_i$ required to generate a particular bias resistance $R_{bias}$ is known and since the amount of detected light and corresponding generated current is known for a particular currency denomination region, a reference voltage $V_{REF}$ can be calculated such that the corresponding generated voltage signal $V_E$ would equal the reference voltage $V_{REF}$ at the end of the integration time $T_i$ for that region of a valid banknote.

The circuit of FIG. 5 compares the generated voltage $V_E$ against the reference voltage $V_{REF}$ and measures the integration time it takes the voltage $V_E$ to reach the reference voltage $V_{REF}$. The measured integration time may then be used by the processing unit 30 as a parameter by the microprocessor in determining the banknote's validity. The capacitor 90 may then be reset to 0 volts immediately prior to the time when the next banknote region of interest is transported between the light source 25 and the photodetector 70, such as at time $T_5$. The photodetector interface circuit 115 of FIG. 5 eliminates the electrical offsets present in the signal generated by the photodetector 70 at a further reduced cost with the substitution of the comparator 510 for the analog-to-digital converter 96 of FIG. 1.

In the alternative, the microprocessor 30 may compensate for any electrical offsets that effect the integration times generated by the comparator 510 in the photodetector interface circuit 115 of FIG. 5. Since the available dynamic range of the photodetector interface circuit 115 of FIG. 5 is typically greater than that of the A/D converter 96 of the corresponding circuit in FIG. 1, the electrical offsets may be alternatively compensated for by a suitable routine performed by the microprocessor 30 without a loss in precision. Suitable compensation routines to remove offsets are known in the art and include, for example, the use of reference offset values that are determined during a calibration of the optical sensing system 1. Calibration may be performed using a calibration surface as described above to determine the electrical offset values. The microprocessor 30 may then use these values to normalize the integration time values generated during banknote validation.

Figure 7:
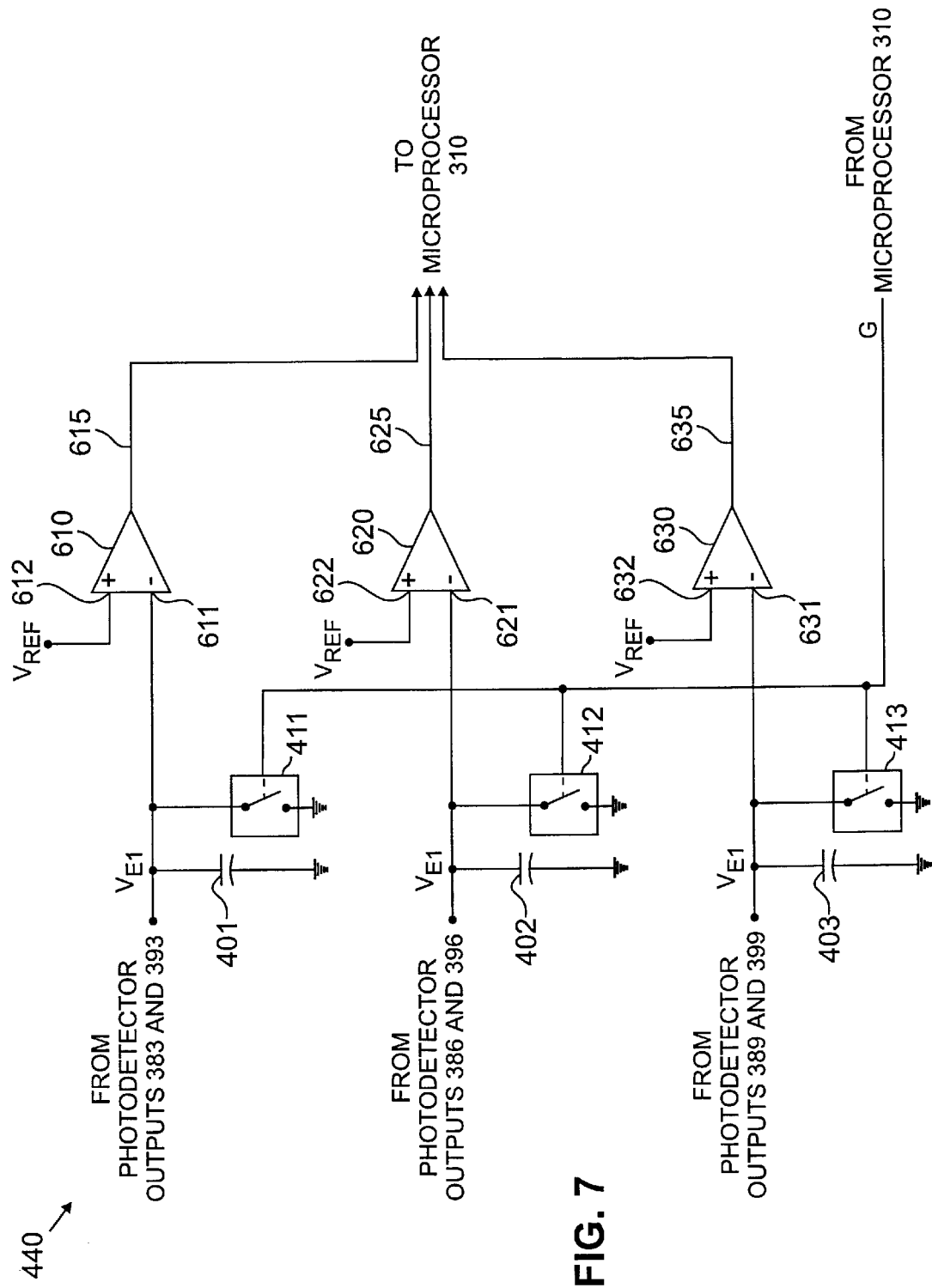
FIG. 7 is a schematic block diagram of an alternative photodetector interface circuit for use in the multi-sensor optical sensing system of FIG. 3.

FIG. 7 shows an alternative embodiment of the multiplexed photodetector interface circuit 440 of FIG. 3 that corresponds to the photodetector interface circuit shown in FIG. 5. In FIGS. 3 and 7 similar components have been like numbered for clarity, for example, the capacitors 401–403 and the voltage signals $V_{E1}$–$V_{E3}$. Referring to FIG. 7, the capacitors 401–403 and the corresponding reset switches 411–413 are arranged in parallel between ground and the respective photodetector outputs 383 and 393, 386 and 396, and 389 and 399, shown in FIG. 3. The capacitors 401–403 and the corresponding reset switches 411–413 are also connected to first inputs 611, 621 and 631 of comparators 610, 620 and 630, respectively. Second comparator inputs 612, 622 and 632 are connected to a reference voltage $V_{REF}$. The comparators 610, 620 and 630 generate voltage signals at respective outputs 615, 625 and 635 connected to the microprocessor 310, shown in FIG. 3. The reset switches 411–413 operate in open or closed positions as commonly controlled by the control signal G generated by the microprocessor 310.

The microprocessor 310 controls the multiplexed operation of the system 300 employing the photodetector interface circuit 440 of FIG. 7 in a substantially identical manner as the multiplexed photodetector interface circuit 440 of FIG. 3. The microprocessor 310 further controls the discrimination operations of the multiplexed photodetector interface circuit 440 in a substantially identical manner as the photodetector interface circuit 115 of FIG. 5. As in the case with the photodetector interface circuit 115 of FIG. 5, the multiplexed photodetector interface circuit 440 of FIG. 7 eliminates the electrical offsets present in the signals generated by the photodetectors 381, 384, 387, 391, 394 and 397, at a reduced cost with the substitution of the comparators 610, 620 and 630 for the multichannel analog-to-digital converter 420 of FIG. 3.

Figure 8:
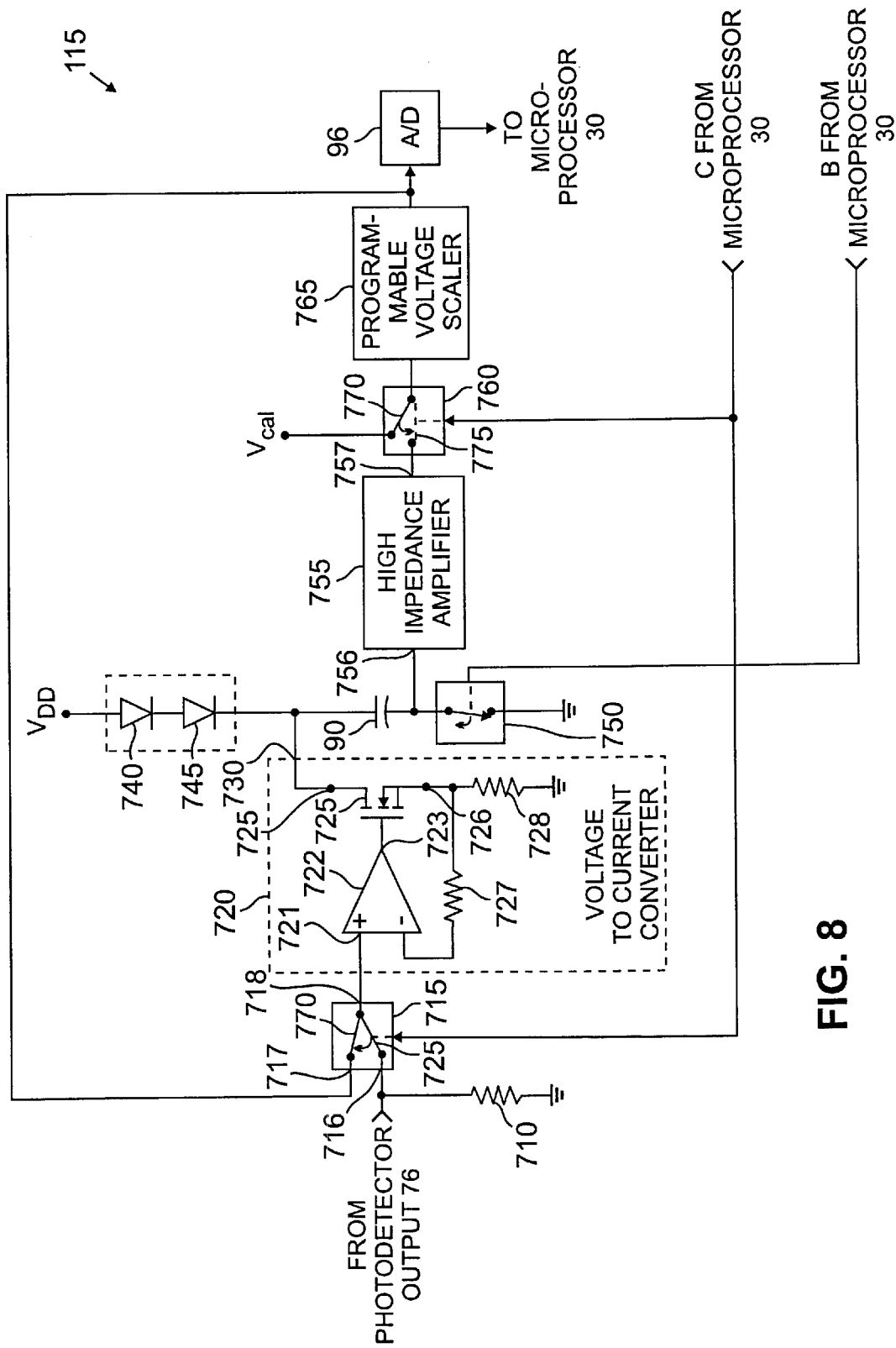
FIG. 8 is a schematic block diagram of a second alternative photodetector interface circuit in the system of FIG. 1.

FIG. 8 is an alternative embodiment of the photodetector interface circuit 115 of the FIGS. 1 and 5 having a logarithmic scaled output signal. A logarithmic scaled output signal provides sufficient compression of photodetector information such that the microprocessor 30 can account for wide variations of detected light from valid banknotes. Such variations may be caused from differences in the amount of light transmitted through or reflected from newer and older banknotes. In addition, the photodetector interface circuit 115 of FIG. 8 performs a calibration operation before each data reading to compensate for the electrical offsets discussed above with regard to FIG. 1 as well as normalize the data provided to an A/D converter. Similar components in FIGS. 1 and 8 are like numbered, such as the capacitor 90 and the A/D converter 96.

Referring to FIG. 8, the photodetector output 76 of FIG. 1 is connected to a resistor 710 and a first input 716 of a controllable switch 715. The resistor 710 is further connected to ground. A voltage signal $V_I$ is provided at an output 718 of the switch 715 to an analog signal converter such as a current sink-type voltage-to-current (V-to-I) converter 720. Components of an exemplary V-to-I converter 720 are shown within the outline of the converter 720 which are not meant to be a limitation of the present invention. Any current sink-type V-to-I converter 720 may be used with the present invention. An input voltage range of a suitable V-to-I converter 720 is 0 to 2.0 V with a corresponding output current sink range of 0 to 20 mA.

The components of the exemplary V-to-I converter 720 in FIG. 8 include an operational amplifier (OP-AMP) 722, a MOSFET transistor 725 and first and second resistors 727 and 728. A first OP-AMP input 721 is connected to the switch output 718. An OP-AMP output 723 is connected to a gate 724 of the transistor 725. A transistor source 726 is connected to the first and second resistors 727 and 728. The resistors 727 and 728 are connected to a second OP-AMP input 728 and to ground, respectively. A drain 729 of the transistor 725 corresponds to an output 730 of the V-to-I converter 720.

The V-to-I converter output 730 is connected to the capacitor 90 and to a logarithmic current to voltage (I-to-V) converter 735 which may be a at least one diode. The I-to-V converter 735 shown in FIG. 8 consists of a pair of diodes 740 and 745 connected in series. The logarithmic I-to-V converter 735 is further connected to the fixed voltage $V_{DD}$ which may be 8.0 V. The diodes 740 and 745 may be general purpose silicon diodes or any other device or circuit that produces a voltage that is a logarithmically proportional to a current.

The capacitor 90 is further connected to a switch 750 and to an input 756 of a high impedance amplifier 755. A suitable high impedance amplifier 755 may be constructed using an OP-AMP in a manner well known in the art. The switch 750 is also connected to ground and operates to connect or disconnect the capacitor 90 from ground based on the control signal C from the microprocessor 30, shown in FIG. 1. Voltage signals appearing at the V-to-I converter output 720 and the amplifier input 756 are represented by reference symbols $V_L$ and $V_D$, respectively.

An output 757 of the amplifier 755 is connected to a controllable switch 760 that is further connected to a fixed voltage $V_{Cal}$ and to a programmable voltage scaler 765. The programmable voltage scaler 765 is also connected to the A/D converter 96 and to a second input 717 of the switch 715. A suitable programmable voltage scaler 765 is a first quadrant multiplying 12 bit DAC such as an MAX539 available from Maxim Integrated Products, Sunnyvale, Calif., which operates to generate a scaled output voltage signal $V_{SO}$ based on an input voltage signal $V_{SI}$ according to the following equation: $V_{SO}=V_{SI}(2)(N)/4096$, where N is a programmable integer value that may range from 0 to 4095. The value N may be programmed by the microprocessor 30 or by other means.

The positions of the switches 715 and 760 are controlled by the control signal B generated by the microprocessor 30. The control signal B is not used as a photodetector enable signal as in FIGS. 1 and 5, but is used to operate the switches 715 and 760 to cause the circuit 115 to function in a calibration or read mode. The positions of the switches 715 and 760 shown by solid lines 770 are used when the circuit 115 is in the calibration mode. The positions of the switches 715 and 760 shown by dashed lines 775 are used when the circuit 115 is in the read mode.

A timing diagram illustrating an exemplary operation of the optical interface circuit 115 is shown in FIGS. 9A-9F. The waveforms for the control signals B and C which are also shown in FIGS. 2B-2C, 6B-6C, and 9A-B are like numbered 120 and 130, respectively. The voltages signals $V_{SO}$, $V_I$, $V_L$ and $V_D$ are represented by waveforms 810, 820, 830 and 840, respectively. "Don't care" regions of the waveforms 800 are represented by shaded regions, for example, shaded region 850.

As shown in FIGS. 2A and 6A, immediately after detecting that a banknote 40 is being transported between the light source 25 and the photodetector 70, the microprocessor 30 generates the control signals A 110 in a high logic state to illuminate the light source 25 as shown in FIGS. 1, 2A and 6A. The control signal A in the high logic state has not been shown in FIGS. 9A-9F for ease of illustration. The light source 25 may be illuminated for the duration of the banknote discrimination test.

Referring to FIGS. 8 and 9A-9F, prior to when a banknote portion of interest is transported between the light source 25 and photodetector 70, such as at time $T_1$, the microprocessor 30 calibrates the photodetector interface circuit 115 by generating the control signal B 120 in a low logic state and the control signal C 130 in a high logic state. Generation of the control signal C in a low logic state causes the switch 750 to connect the capacitor 90 to ground. Generation of the control signal B in a high logic state causes the switch 760 to connect the programmable voltage scaler 765 to the fixed voltage $V_{Cal}$ and the switch 715 to provide the voltage signal $V_{SO}$ to the V-to-I converter 720.

Figure 9A:
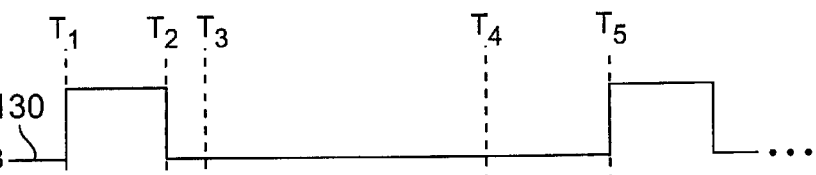
FIGS. 9A-9F depict is a timing diagram of exemplary signals waveforms which may be generated by the optical sensing system of FIG. 1 employing the photodetector interface circuit of FIG. 8.
Figure 9B:
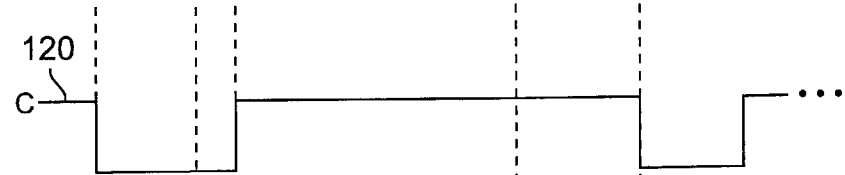
Figure 9C:
Figure 9D:
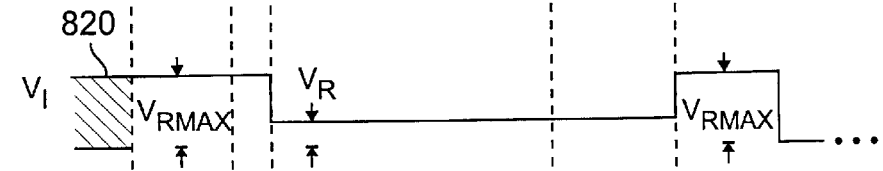

Accordingly, at time $T_1$, the magnitude of the voltage scaler output signal $V_{SO}$ is a scaled version of the fixed voltage $V_{Cal}$. Since, at time $T_1$, the voltage scaler 765 is connected to the V-to-I converter 715 the voltage signals $V_I$ and $V_{SO}$ have the same magnitude. The fixed voltage $V_{Cal}$ and the multiplying value N of the voltage scaler 765 should be selected such that the resulting magnitude of the voltage signals $V_I$ and $V_{SO}$ during the calibration mode correspond to a calibration signal of a maximum read voltage $V_{RMAX}$ as indicated in FIGS. 9C-9D. The maximum read voltage $V_{RMAX}$ is the maximum voltage across the resistor 710 that could possibly be produced by the photodetector 70 while detecting the banknote 40 based on the photodetector sensitivity and brightness of the light source 25. A typical maximum voltage signal $V_{RMAX}$ across the resistor 710 having a resistance of 1.0 KΩ is 250 mV. If the fixed voltage $V_{Cal}$ is 2.5 V then a typical value N for the voltage scaler would be 205.

Since the voltage signal $V_1$ is at a maximum the V-to-I converter 720 will draw a maximum amount of current through the diodes 740 and 745. The voltage $V_L$ will then be at a minimum value $V_{LMIN}$ as a maximum logarithmically scaled voltage drop will occur over the diodes 740 and 745. A typical value for the voltage $V_{LMIN}$ is on the order of 6.0 V when the fixed voltage $V_{DD}$ is 8.0 V and general purpose silicon diodes are used for the diodes 740 and 745. Since, the capacitor 90 is connected to ground by the switch 750 the capacitor 90 charges to the voltage $V_L$ having the magnitude $V_{LMIN}$. Also, at time $T_1$, the amplifier input 756 is connected to ground causing the voltage signal $V_D$ to be 0 V.

At time $T_2$, the voltage across the capacitor 90 corresponds to the maximum voltage signal that may be caused by the photodetector 70 and includes the electrical offsets generated by the other components of the system 1, shown in FIG. 1. Further, at time $T_2$, which is still prior to when a banknote portion of interest passes between the light source 25 and photodetector 70, the control signal C 130 is generated in a low logic state causing switch 750 to open and the voltage of the capacitor 90 to float. A short time later, such as time $T_3$, the control signal B 120 is generated in a high logic state causing the switches 715 and 760 to change positions and the circuit 115 to end its calibration mode and enter its read mode. Accordingly, the switch 715 connects the photodetector output 76 to the V-to-I converter 720 and the switch 760 connects the amplifier 755 to the voltage scaler 765. In addition, a new predetermined integer value N is provided to the voltage scaler 765 such that the output voltage signal $V_{SO}$ is normalized and takes advantage of the available dynamic range of the A/D converter 96. In this manner, the A/D converter 96 may generate data that could be used for accurate ratio testing between two or more sensors.

A banknote portion of interest passes between the light source 25 and the photodetector 70 between times $T_3$ and $T_4$. At time $T_3$, the voltage signal $V_I$ is the voltage across the resistor 710 which corresponds to the amount of light detected by photodetector 70 for that banknote portion. In FIG. 9D, the voltage signal $V_I$ after time $T_3$ is shown having a voltage $V_R$ which is less than the maximum voltage $V_{RMAX}$ for illustration purposes only. The V-to-I converter 720 converts the voltage signal $V_R$ to a current signal that corresponds to the amount of detected light which causes the voltage signal $V_L$ to increase from the minimum voltage $V_{LMIN}$ to a voltage $V_{LR}$. Since the voltage across the diodes 740 and 745 is logarithmically proportional to the current drawn threw the diodes by the V-to-I converter 720 the voltage $V_{LR}$ is inversely logarithmically proportional to the amount of detected light.

Figure 9E:
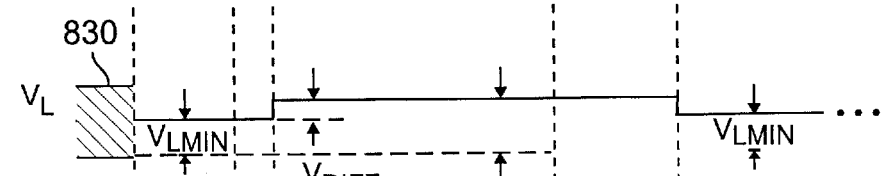
Figure 9F:
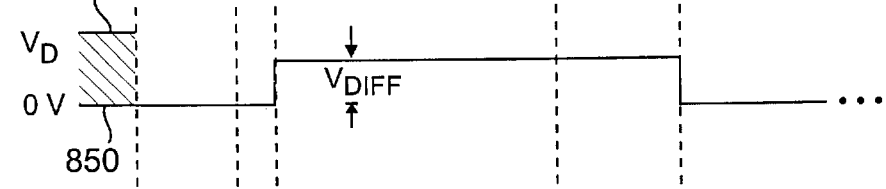

The increase in the V-to-I converter output voltage $V_L$ from the minimum voltage $V_{LMIN}$ to a voltage VLR is illustrated as a voltage difference $V_{DIFF}$ in FIG. 9E. The increase in the voltage $V_L$ of the magnitude $V_{DIFF}$ causes the voltage signal $V_D$ to likewise increase from 0 V to a voltage $V_{DIFF}$. The voltage signal $V_D$ is the voltage difference $V_{DIFF}$ between the voltage $V_{LR}$ and the voltage $V_{LMIN}$ stored across the capacitor 90. Such a voltage difference occurs because there is no discharge path for the capacitor 90 since it is connected to the high impedance input 756 of the amplifier 755. Since the voltage stored in the capacitor 90 is $V_{LMIN}$ which represents the maximum photodetector signal including the electrical offsets the electrical offsets cancel out in the generated voltage signal $V_D$ having the voltage $V_{DIFF}$. Thus, the voltage signal $V_D$ having a magnitude $V_{DIFF}$ represents the logarithmic scaled difference of the maximum signal and the actual amount of detected light without electrical offsets.

The voltage signal $V_D$ having the magnitude $V_{DIFF}$ is amplified by the amplifier 755 and then amplified/attenuated by the voltage scaler 765 to generate the corresponding voltage signal $V_{SO}$. The voltage signal $V_{SO}$ is proportional to the voltage signal $V_D$ and is likewise inversely logarithmically proportional to the amount of detected light. Accordingly, the voltage signal $V_{SO}$ is provided to the A/D converter 96 which provides a digital value representing the signal magnitude to the microprocessor 30.

While the banknote portion of interest passes between the light source 25 and the photodetector 70 between times $T_3$ and $T_4$, the microprocessor 30 samples the voltage signal $V_{SO}$ via the A/D converter 96. The voltage signals $V_I$, $V_L$, and $V_D$ are depicted as constant voltages between times $T_3$ and $T_4$ for ease of illustration purposes only. As different portions of the banknote 40 pass between the light source 25 and the photodetector 70 during this time interval, such voltages signals will vary based on the amount of detected light transmitted from the banknote 40.

Prior to when a next banknote portion of interest passes between the light source 25 and the photodetector 70, such as at time $T_5$, the microprocessor 30 causes the photodetector interface circuit 115 to again enter its calibration mode by generating the control signals B and C in low and high logic states, respectively. The next banknote portion of interest is then detected in a substantially identical way as that described above. Accordingly, the circuit 115 of FIG. 8 enters the calibration mode before each banknote portion of interest is detected.

Although a single voltage scaler 765 is used for the calibration and the read mode, The voltage scaler 765 may be used for solely the read mode with a fixed calibration voltage source connected to the switch input 716 may be employed according to the present invention. In such an embodiment, the switch 760 may be omitted. During the calibration mode, the fixed calibration voltage source would provide the calibration signal that corresponds to the maximum signal generated by the photodetector 70. Further, during the read mode, the voltage scaler would scale the difference signal amplified by the amplifier 755. Accordingly, a programmable voltage scaler with a high impedance input may be substituted for the amplifier 755 and voltage scaler 765.

In an alternative embodiment of the photodetector interface circuit 115 of FIG. 8, a plurality of photodetector sets may be multiplexed to sample different portions of the banknote 40 using one or more different colored light sources in a similar manner as that shown in FIG. 3. In this alternative multiplexed embodiment, a multiple-input switch is substituted for the switch 715. The added switch inputs accommodate the outputs of other photodetectors which have respective output transistors substantially identical to the output resistor 710. The photodetectors may be grouped as sets as shown in FIG. 3. The voltage scaler output $V_{SO}$ should also remain connected to one of the switch inputs to operate the circuit 115 in its calibration mode.

As banknote portions of interest pass by the photodetectors, the multiplexed photodetector interface circuit operates sequentially in a calibration mode and then a read mode to generate digital signals corresponding to the amount of detected light from the banknote 40. The value N for the voltage scaler is adjusted accordingly for each calibration mode sequence as well as for each read mode sequence to compensate for electrical offsets and to normalize the sensor data from each photodetector.

Although several embodiments of the optical interface circuit have been described in detail above, many modifications are possible to the described embodiments without departing from the teaching of the present invention. All such modifications are intended to be encompassed by the present invention. For instance, other devices may be used to produce a variable bias load in the photodetector interface circuit 115 according to the present invention. The capacitor 90 and reset switch 100 may be replaced with a voltage controlled variable resistor such as a suitable matched transistor pair configuration, or a digital potentiometer integrated circuit such as a DS1267 available from Dallas Semiconductor Corporation. Further, in addition to acceptance testing of banknotes, the present invention may be used for acceptance of other documents, such as negotiable and non-negotiable instruments.

I claim:

1. An optical interface circuit for use in an optical sensing a system for validating documents, the system including at least one controllable light source and a microprocessor, the optical interface circuit comprising:
   a photodetector for generating signals based on the amount of detected light;
   a switch connected to the photodetector and controlled by the microprocessor to activate and deactivate the photodetector;
   a variable bias load connected to the photodetector output and to the microprocessor; and
   a signal converter connected to the variable bias load and having an output connected to the microprocessor, wherein the optical interface circuit is controllable by the microprocessor to provide signals indicative of document authenticity which contain a minimum of electrical offsets.

2. The circuit of claim 1 wherein the signal converter is an analog-to-digital converter.

3. The circuit of claim 1 wherein the variable bias load comprises:
   a charge storage device connected to the photodetector output and to ground; and,
   a reset switch connected to the charge storage device and to the microprocessor.

4. The circuit of claim 3 wherein the resistance of the charge storage device is varied by adjusting a charge time interval.

5. The circuit of claim 4, wherein the charge time interval is based on the time interval required to generate a converted signal of a particular value when a calibration surface is positioned proximate the photodetector.

6. The circuit of claim 1, further comprising a temperature sensor.

7. The circuit of claim 1, wherein the signal converter is a comparator, the comparator having a reference input connected to a reference voltage signal.

8. An optical interface circuit for use in an optical sensing system including a plurality of controllable light sources and a processing unit, comprising:

at least two sets of photodetectors, each photodetector set containing at least one photodetector, each photodetector set being activated or deactivated by a processing unit, each photodetector having an output for generating electrical current signals based on a corresponding amount of detected light; and a photodetector interface circuit having a plurality of inputs, the number of inputs being at least the number of photodetectors in a set having the greatest number of photodetectors, each photodetector interface circuit input being connected to a photodetector of at least one set, wherein the photodetector interface circuit contains a plurality of variable bias loads controllable by the processing unit, each variable bias load receiving the electrical current generated by a corresponding activated photodetector, a signal converter having a plurality of inputs and an output, each input of the signal converter being connected to a corresponding variable bias load, the signal converter having an output connected to the processing unit, wherein a particular photodetector set is activated for a period of time and wherein the signal convertor provides converted electrical current signals generated by the photodetectors in the activated set to the optical sensing system, wherein the electrical offsets in the converted signals are minimized.

9. The circuit of claim 8, wherein the signal converter is a multi-channel analog-to-digital converter.

10. The circuit of claim 8, wherein each variable bias load comprises:

a charge storage device connected to the photodetector outputs and to ground; and a reset switch connected between the charge storage device and ground, wherein the processing unit controls the reset switch to discharge the charge storage device.

11. The circuit of claim 10, wherein the optical sensor system is operable to vary the resistance of the bias loads by adjusting charge time intervals of the charge storage devices by controlling the respective timings of activation and deactivation of the photodetectors in a set and the corresponding reset switches.

12. The circuit of claim 11, wherein the charge time interval is based on the time interval required to generate a converted signal of a particular value when a calibration surface is positioned proximate the photodetector.

13. The circuit of claim 8, further comprising a temperature sensor connected to the processing unit for providing temperature data, and wherein the processing unit is capable of varying the resistance of the bias loads based on the temperature data to minimize any temperature induced electrical offsets.

14. The circuit of claim 8, wherein the signal converter comprises a plurality of comparators, each comparator having a reference input for receiving a reference voltage signal.

15. The circuit of claim 14, wherein effects of electrical offsets in the signal generated by a comparator are substantially eliminated by the processing unit based upon values obtained when a calibration surface is positioned proximate the photodetector.

16. The circuit of claim 8 wherein the optical sensing system is capable of validating banknotes.

17. The circuit of claim 16 wherein the number of photodetector sets is two to detect respective infra-red and red light.

18. An optical interface circuit for use in an optical sensing system having a processing unit, for validating documents, comprising:

at least one photodetector having an output, each photodetector being capable of activation and deactivation by the processing unit, and when activated each generates signals at its output based on an amount of detected light;

a charge storage device connected to each photodetector put and to ground;

a reset switch connected between each charge storage device and ground, wherein the processing unit controls each reset switch to discharge each charge storage device; and a signal converter having an input connected to each variable bias load and to each photodetector output, the signal converter having an output connected to the processing unit, and wherein the processing unit controls the timing of activation and deactivation of the photodetector and is capable of varying the resistance of each charge storage device by adjusting a charge time interval to minimize electrical offsets.

19. The circuit of claim 18, wherein the signal converter is an analog-to-digital converter.

20. The circuit of claim 18, wherein the charge time interval is based on the time interval required to generate a converted signal of a particular value when a calibration surface is positioned proximate the photodetector.

21. A method for operating an optical sensor system to validate documents, comprising:

transporting a document proximate a controllable light source and a photodetector;

illuminating the light source;

activating the photodetector to generate an electrical current signal;

converting the electrical current signal to a voltage signal with a variable bias load;

adjusting a resistance of the variable bias load to minimize the effects of any electrical offsets contained in the electrical current signal; and converting the voltage signal into a signal readable by a processing unit.

22. The method of claim 21, further comprising the step of sampling the voltage signal with an analog-to-digital converter to generate a digital signal corresponding to the amount of detected light.

23. The method of claim 21, wherein the step of adjusting the resistance of the variable bias load includes charging a charge storage device for a predetermined charge time interval.

24. The method of claim 23, further comprising determining the charge time interval based on the time interval required to generate a digital signal of a particular value when a calibration surface is positioned proximate the photodetector.

25. The method of claim 24, wherein the step of determining the charge time interval is based on a binary search technique.

26. The method of claim 23, further comprising discharging the charge storage device prior to the step of charging the charge storage device.

27. The method of claim 26, further comprising deactivating the photodetector at the end of the charge time interval prior to the step of sampling the voltage signal.

28. The method of claim 21, further comprising:

multiplexing at least two photodetectors capable of detecting different colored light to the bias load; and individually activating the photodetectors to provide a corresponding electrical current signal to the variable bias load for generation of respective voltage signals.

29. A method for validating documents comprising:

transporting a document proximate a controllable light source and a photodetector;

illuminating the light source;

activating the photodetector to generate an electrical current signal based on the amount of detected light;

converting the generated electrical current signal to a voltage signal by using a charge storage device;

comparing the voltage of the charge storage device as it is charging against a reference threshold voltage; and generating a pulse starting at the time the charge storage device has completed discharging and ending when the voltage has surpassed the threshold voltage, wherein the pulse width indicates the amount of detected light.

30. The method of claim 29, further comprising compensating for electrical offsets in the generated current signal based on the pulse width generated when a calibration surface is positioned proximate the photodetector.

31. A method for validating documents, comprising:

a) transporting a document proximate a controllable light source and a photodetector;

b) illuminating the light source;

c) activating the photodetector to generate an electrical current signal based on the amount of detected light;

d) charging a charge storage device based on a calibration signal that causes a respective voltage drop over a current-to-voltage converter, wherein the calibration signal corresponds to a maximum signal which could be generated by the photodetector;

e) maintaining the voltage across the charge storage device;

f) applying the electrical current signal generated by the photodetector to the current-to-voltage converter, which causes a voltage signal corresponding to a voltage difference between the signal generated by the photodetector and the calibration signal to appear at one end of the charge storage device, wherein the voltage difference is inversely logarithmically proportional to the amount of detected light; and g) repeating steps d)–f) for each document portion that is to be detected.

32. The method of claim 31, further comprising:

amplifying the difference voltage; and sampling the voltage signal with an analog-to-digital converter to generate a digital signal corresponding to the amount of detected light.

33. The method of claim 32, wherein the step of amplifying the difference voltage amplifies such voltage such that a substantially maximum amount of the A/D converter's dynamic range is used.

34. The method of claim 31 further comprising discharging the charge storage device prior to the charging step.

35. The method of claim 31, further comprising:

multiplexing at least two photodetectors to the charge storage device; and individually activating the photodetectors to provide a corresponding electrical current signal to the charge storage device for generation of respective voltage signals.

36. The method of claim 35, wherein the two photodetectors are capable of detecting different colored light.

* * * * *

UNITED STATES PATENT AND TRADEMARK OFFICE
CERTIFICATE OF CORRECTION

PATENT NO. : 6,819,781 B1
DATED : November 16, 2004
INVENTOR(S) : Joseph A. Simpkins It is certified that error appears in the above-identified patent and that said Letters Patent is hereby corrected as shown below:

<u>Column 18,</u>
Line 31, before "system" delete "a".

<u>Column 20,</u>
Line 11, replaced "put" with -- output --.

Signed and Sealed this

Eleventh Day of April, 2006

JON W. DUDAS
*Director of the United States Patent and Trademark Office*